Sept. 1, 1964         L. PERAS         3,146,638
ROTARY ENGINE TRANSMISSION SYSTEMS
Filed Oct. 6, 1961                    2 Sheets-Sheet 1

Inventor
Lucien Peras
By Stevens Davis Miller & Mosher
Attorneys

Sept. 1, 1964 L. PERAS 3,146,638
ROTARY ENGINE TRANSMISSION SYSTEMS
Filed Oct. 6, 1961 2 Sheets-Sheet 2

Inventor
Lucien Peras
By Stevens Davis Miller & Mosher
Attorneys

United States Patent Office 3,146,638
Patented Sept. 1, 1964

3,146,638
ROTARY ENGINE TRANSMISSION SYSTEMS
Lucien Peras, Billancourt, France, assignor to Regie Nationale des Usines Renault, Billancourt, France
Filed Oct. 6, 1961, Ser. No. 143,503
Claims priority, application, France, Oct. 19, 1960, 841,602, Patent 1,277,378
3 Claims. (Cl. 74—805)

This invention relates to transmission systems for rotary engines of the type wherein the rotor is rotatably mounted on an eccentric rigid with a crankshaft.

It is the object of this invention to provide a gear-type power transmission system comprising gears solid with the rotor and at least one rotor driving gear.

It is known that rotor driving gears revolve eccentrically with the rotor internally of a fixed annulus rigid with the stator.

The momentary centre of rotation of the movable gear lies at the point of contact of the pitch circles of the gear and annulus and at this point the speed is zero.

If this rotor driving gear is connected to another gear of different diameter, the centre of this other gear will also describe a circular path or orbit and its specific property will be that none of its teeth will have zero speed during the operation of the engine.

Therefore, if this other gear is caused to mesh with an internally toothed annulus centred on a stator bearing, this annulus will be driven at an angular speed as a function of the eccentricity and ratios of the different sets of teeth.

This speed will be either reduced or increased in relation to the angular velocity of the crankshaft.

Figure 1:
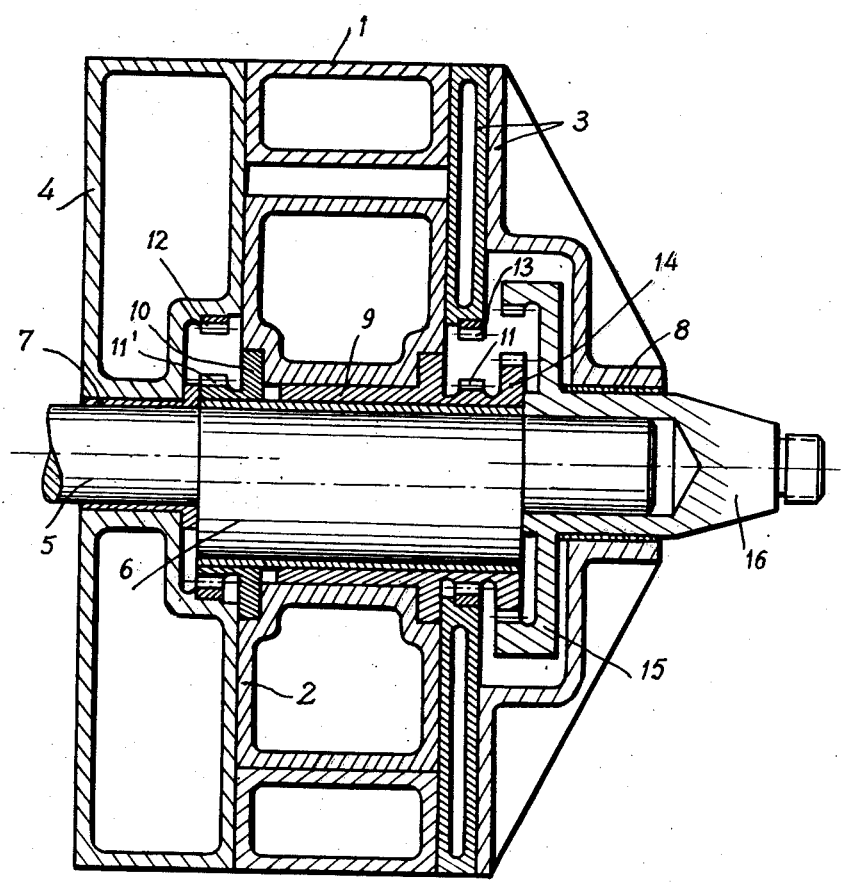
Figure 2:
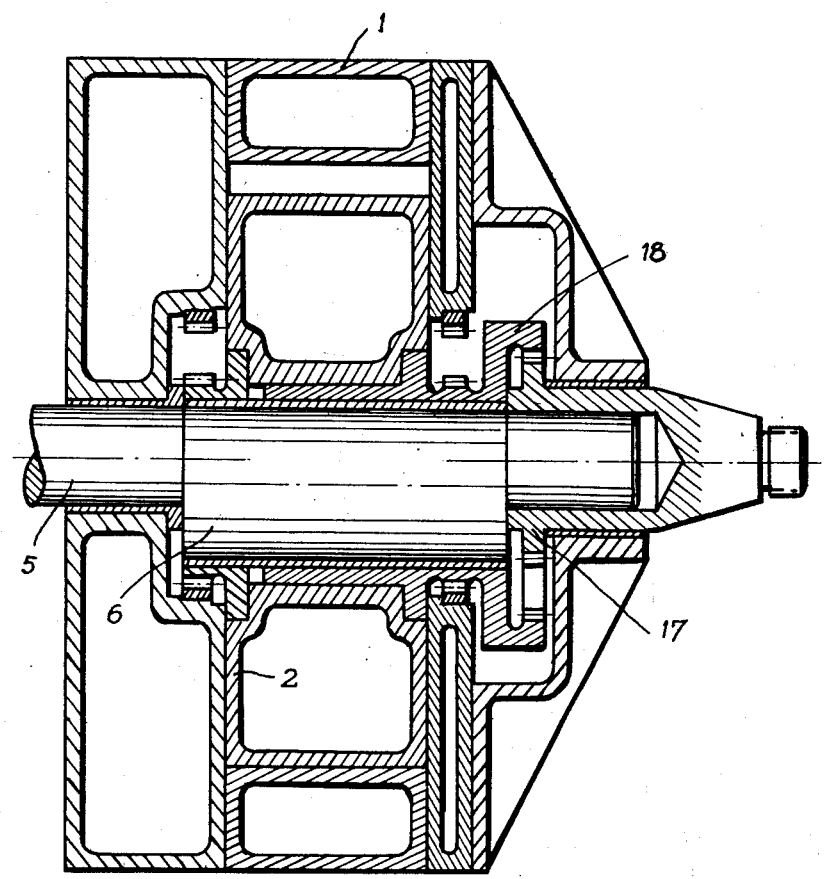

In order to afford a clearer understanding of this invention and of the manner in which the same may be carried out in practice, two specific forms of embodiment thereof will now be described by way of example with reference to the accompanying drawings, in which:

FIGURE 1 is an axial section showing a rotary engine according to a first form of embodiment, and FIGURE 2 is a similar view showing an alternate embodiment of the engine.

Referring first to FIG. 1, the reference numeral 1 designates the stator, 2 is the rotor and 3, 4 are the end walls or flanges of the stator casing. The crankshaft 5 carries an eccentric 6 on which the rotor 2 is rotatably mounted.

This crankshaft 5 is centered in bearings 7, 8 carried by the stator flanges.

In flanged or shouldered sockets 9, 10, rigid with the rotor 2, rotor driving gears 11, 11' are cut which mesh with the corresponding internally toothed annuli 12, 13 of the stator.

The gear 11 is rigid with another gear 14 of different diameter which revolves similarly in an eccentric manner at the same angular speed as the rotor. Another annulus 15 meshing with this supplemental gear 14 is centred in the stator bearing 8 and drives a stub shaft 16.

During the operation of the engine, the rotor revolves about its axis and at the same time accomplishes an orbital or eccentric movement about the shaft 5. Therefore, it drives the internally toothed annulus 15 at a speed which is a direct function of the selected gear diameters, that is, with a step-up or step-down gear ratio in relation to the velocity of rotation of the eccentric.

FIGURE 2 shows an alternate embodiment wherein the secondary gear 18 connected to the rotor is an internally toothed gear or annulus and the secondary gear 17 connected to the output shaft is an externally toothed gear.

This device may constitute a step-up or step-down gearing, according to the diameters of gear 17 and annulus 18, the other driving gears remaining unchanged.

Thus, this transmission system is applicable to the case of a reduction gearing for driving an aircraft or marine propeller, or any other member to be driven at a relatively low speed, and also to the case of a step-up gearing for driving at relatively high speed a dynamic compressor or any other apparatus.

Although the present invention has been described in conjunction with only two preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. Transmission system for rotary engines comprising a stator, a crankshaft rotatably mounted in the stator, an eccentric rigidly mounted on the crankshaft, a driving rotor rotatably mounted on the eccentric, at least one driving gear solid with the rotor, at least one internally toothed annulus rigid with the stator and in constant meshing engagement with said driving gear, a rotary output shaft, and a gear means operatively connecting the output shaft to the driving rotor whereby the rotor is drivingly connected to the stator through said driving gear and annulus and to the output shaft through said gear means.

2. Transmission system for rotary engines according to claim 1, characterized in that the gear means consists of a pinion mounted on the rotor and rolling inside an annulus solid with the output shaft.

3. Transmission system for rotary engines according to claim 1, characterized in that the gear means consists of an internally toothed annulus connected to the rotor and an externally toothed gear connected to the output shaft.

References Cited in the file of this patent

UNITED STATES PATENTS

| | | |
|---|---|---|
| 785,552 | Holland | Mar. 21, 1905 |
| 2,881,619 | Fox | Apr. 14, 1959 |
| 2,959,983 | Wise | Nov. 15, 1960 |
| 2,991,665 | Sundt | July 11, 1961 |